(12) United States Patent
Cruz-Hernandez et al.

(10) Patent No.: US 9,158,379 B2
(45) Date of Patent: Oct. 13, 2015

(54) HAPTIC WARPING SYSTEM THAT TRANSFORMS A HAPTIC SIGNAL INTO A COLLECTION OF VIBROTACTILE HAPTIC EFFECT PATTERNS

(71) Applicant: Immersion Corporation, San Jose, CA (US)

(72) Inventors: Juan Manuel Cruz-Hernandez, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 65 days.

(21) Appl. No.: 14/162,814

(22) Filed: Jan. 24, 2014

(65) Prior Publication Data

US 2015/0070151 A1    Mar. 12, 2015

Related U.S. Application Data

(60) Provisional application No. 61/874,920, filed on Sep. 6, 2013, provisional application No. 61/906,975, filed on Nov. 21, 2013.

(51) Int. Cl.
*H04B 3/36* (2006.01)
*G06F 3/01* (2006.01)
*G08B 6/00* (2006.01)
*G11B 27/031* (2006.01)
(Continued)

(52) U.S. Cl.
CPC ............ *G06F 3/016* (2013.01); *G06F 3/04847* (2013.01); *G08B 6/00* (2013.01); *G11B 27/031* (2013.01); *G11B 27/10* (2013.01)

(58) Field of Classification Search
CPC .............................. G06F 3/016; G06F 3/04847
USPC ....................................................... 340/407.1
See application file for complete search history.

(56) References Cited

U.S. PATENT DOCUMENTS 6,374,255 B1 *   4/2002   Peurach et al. ....................... 1/1
7,791,588 B2     9/2010   Tierling et al.
2002/0165720 A1  11/2002  Johnson et al.
(Continued)

FOREIGN PATENT DOCUMENTS

GB         2 226 718 A    7/1990

OTHER PUBLICATIONS

Anonymous: "Transcoding—Wikipedia, the free encyclopedia", Feb. 27, 2013, http://en.wikipedia.org/w/index.php?title=Transcoding&oldid=540873849.
(Continued)

*Primary Examiner* — Kerri McNally
(74) *Attorney, Agent, or Firm* — Miles & Stockbridge P.C.

(57) ABSTRACT

A system is provided that transforms haptic signals into vibrotactile haptic effect patterns. The system receives a haptic signal that includes haptic effect patterns. The system further detects a start time and an end time for each haptic effect pattern. The system further detects haptic effect patterns based on a characteristic, and replaces the detected haptic effect patterns with substitute haptic effect patterns. The system further shifts the start time for each haptic effect pattern back by a shift duration. The system further assigns a vibrotactile haptic effect pattern to each haptic effect pattern. The system further sends the vibrotactile haptic effect patterns to a standard-definition haptic output device to generate vibrotactile haptic effects.

23 Claims, 7 Drawing Sheets

(51) Int. Cl.
 *G11B 27/10* (2006.01)
 *G06F 3/0484* (2013.01)

(56) References Cited

U.S. PATENT DOCUMENTS

| | | |
|---|---|---|
| 2003/0067440 A1 | 4/2003 | Rank |
| 2004/0107356 A1 | 6/2004 | Shamoon et al. |
| 2005/0134561 A1* | 6/2005 | Tierling et al. ............... 345/156 |
| 2007/0126927 A1 | 6/2007 | Yun et al. |
| 2008/0136608 A1 | 6/2008 | Guthrie et al. |
| 2009/0096632 A1 | 4/2009 | Ullrich et al. |
| 2012/0176415 A1* | 7/2012 | Chao ............................ 345/666 |
| 2012/0206247 A1 | 8/2012 | Bhatia et al. |
| 2012/0306631 A1 | 12/2012 | Hughes |
| 2013/0038792 A1 | 2/2013 | Quigley et al. |
| 2014/0176415 A1 | 6/2014 | Buuck et al. |

OTHER PUBLICATIONS

Juan Manuel Cruz-Hernandez et al., U.S. Appl. No. 14/080,860, filed Nov. 15, 2013.
Jamal Saboune et al., U.S. Appl. No. 14/020,461, filed Sep. 6, 2013.
Jamal Saboune et al., U.S. Appl. No. 14/020,502, filed Sep. 6, 2013.

* cited by examiner

HAPTIC WARPING SYSTEM THAT TRANSFORMS A HAPTIC SIGNAL INTO A COLLECTION OF VIBROTACTILE HAPTIC EFFECT PATTERNS

CROSS-REFERENCE TO RELATED APPLICATIONS

This application claims priority of U.S. Provisional Patent Application Ser. No. 61/874,920, filed on Sep. 6, 2013 (the disclosure of which is hereby incorporated by reference), and also claims priority of U.S. Provisional Patent Application Ser. No. 61/906,975 (the disclosure of which is hereby incorporated by reference).

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

A haptic effect developer can author a haptic effect for the device, and the device can be configured to output the haptic effect. Alternately, a device can receive input, such as audio input or video input, can convert the input into a haptic effect, and can output the haptic effect. In either scenario, different types of hardware can be capable of generating different types of haptic effects due to different hardware characteristics. For example, different types of actuators (such as eccentric rotating mass motor actuators, linear resonant actuators, and piezoelectric actuators) are capable of generating different types of haptic effects due to different electromechanical characteristics of the different actuators. In general, a haptic effect developer that wishes to author a haptic effect for a specific type of hardware is required to tailor the haptic effect for the specific hardware. If the haptic effect developer wishes to support multiple hardware types, the haptic effect developer generally has to author different haptic effects, in order to provide an optimal haptic experience for each hardware type. This can result in additional design time and effort involved with authoring haptic effects.

SUMMARY

One embodiment is a system that transforms haptic signals into collections of vibrotactile haptic effect patterns. The system receives a haptic signal that includes haptic effect patterns, where each haptic effect pattern includes data that causes a haptic output device to produce a haptic effect. The system further detects a start time and an end time for each haptic effect pattern. The system further detects haptic effect patterns based on a characteristic, and replaces the detected haptic effect patterns with substitute haptic effect patterns. The system further shifts the start time for each haptic effect pattern back by a shift duration. The system further assigns a vibrotactile haptic effect pattern to each haptic effect pattern, where each vibrotactile haptic effect pattern includes data that causes a standard-definition haptic output device to produce a vibrotactile haptic effect for an active duration and to cease producing the vibrotactile haptic effect for a silent duration. The system further sends the vibrotactile haptic effect patterns to the standard-definition haptic output device to generate vibrotactile haptic effects.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
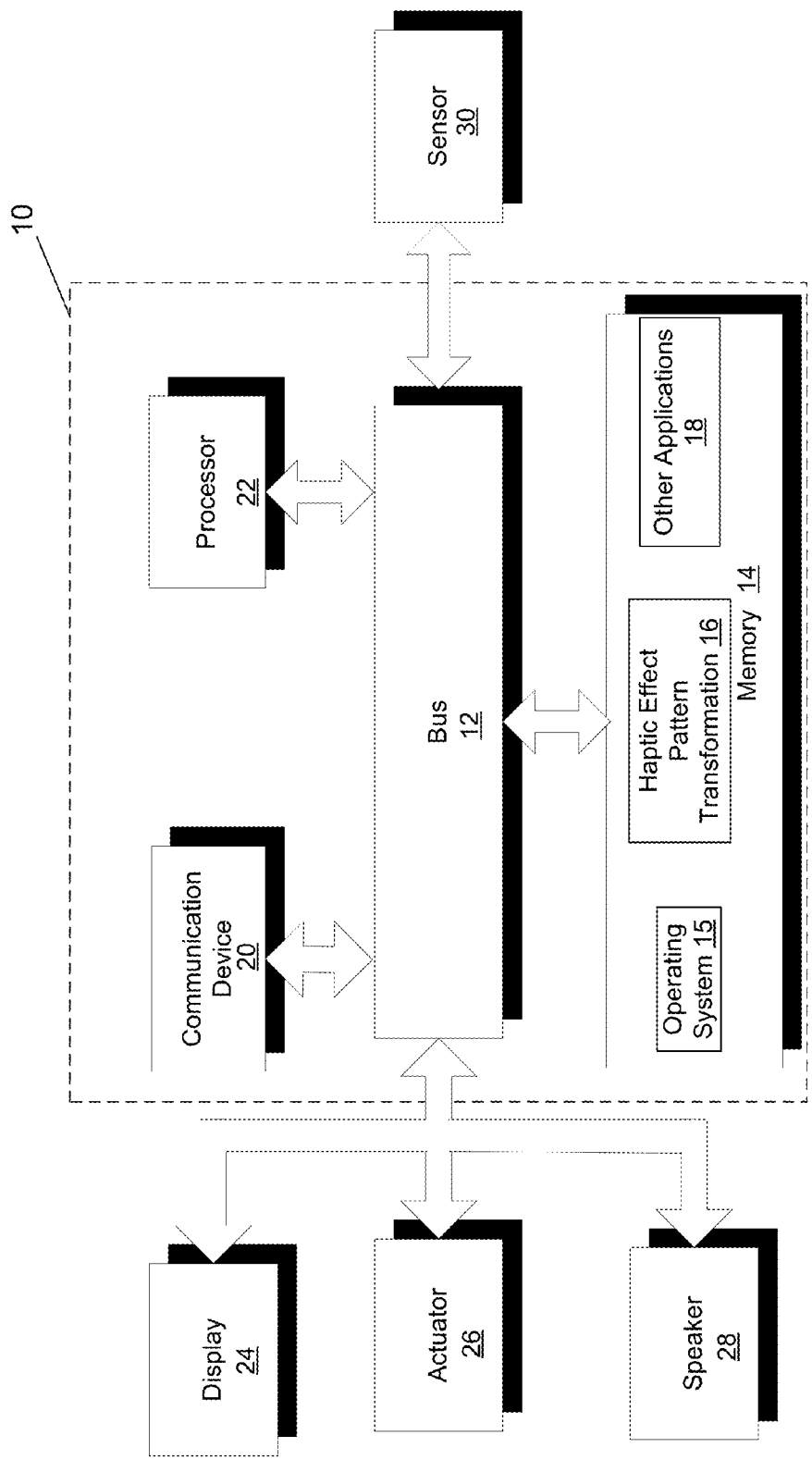
FIG. 1 illustrates a block diagram of a system in accordance with one embodiment of the invention.

One embodiment is a system that transforms or "warps" a haptic signal designed for a high-definition haptic output device (such as a linear resonant actuator or a piezoelectric actuator) into a special type of haptic signal that includes a collection of vibrotactile haptic effect patterns (or some other type of haptic effect patterns) that are designed for a standard-definition haptic output device (such as an eccentric rotating mass motor). In transforming or "warping" the haptic signal, the system replaces the haptic effect patterns contained within the haptic signal with vibrotactile haptic effect patterns. A haptic effect pattern is a collection of data that causes a haptic output device to produce a haptic effect. A vibrotactile haptic effect pattern (also identified as a "vibration pattern") is a specific type of haptic effect pattern that causes a standard-definition haptic output device to produce a vibrotactile haptic effect for a specified duration and to cease producing the vibrotactile haptic effect for a specified duration. The haptic signal can be a haptic signal that is created automatically (e.g., from audio input, video input, and/or sensor input), or created manually (e.g., by a haptic effect designer using a haptic effect development platform). The vibrotactile haptic effect pattern can produce an optimal haptic experience when played on a device equipped by the standard-definition haptic output device by reproducing relevant quality haptic effects of the original haptic signal.

According to the embodiment, the system detects a timing and a characteristic of the haptic effect patterns included within the haptic signal, such as when each haptic effect pattern begins and ends, and whether or not each haptic effect pattern is a texture haptic effect pattern. The system further shifts the haptic effect patterns in time in order to match a response time of the standard-definition haptic output device, and assigns a specific vibrotactile haptic effect pattern to each haptic effect pattern based on the type and duration of each haptic effect pattern. The system can further limit a duration of the vibrotactile haptic effect pattern to a maximum in order to maintain a pleasant haptic experience. The vibrotactile haptic effect patterns can be derived automatically using preset device-specific parameters, or can be created to fit any type of haptic output device. The system can be part of a device, and the transformation of the haptic signal into a special type of haptic signal that includes a collection of vibrotactile haptic effect patterns can either be executed "online" or "offline." Alternatively, the system can be part of a server or microprocessor that is external to the device and the vibrotactile haptic effect can be streamed to the device or embedded within a multimedia file that is transmitted to the device. The system can transform any type of haptic signal, and is not limited to multimedia-related haptic signals.

An example of a standard-definition haptic output device is a standard-definition actuator. A "standard-definition" actuator is an actuator that can provide a baseline range of different vibration effects with a baseline range of vibration intensities. Examples of a standard-definition actuator can include a linear resonant actuator or an eccentric rotating mass motor. An example of a high-definition haptic output device is a high-definition actuator. A "high-definition" actuator is an actuator that can provide an increased range of different vibration effects with an increased range of vibration intensities. Further, the high-definition actuator can increase and decrease its intensity level at a speed that is sufficient to enable compelling rendering of rapidly changing dynamic haptic effects. Examples of a high-definition actuator can include a piezoelectric actuator or an electroactive polymer actuator. Thus, compared to a standard-definition actuator, a high-definition actuator has a fast response time, a high dynamic range, and also a wide frequency response. A high-definition actuator can create haptic effects at a number of frequencies (e.g., 100 Hertz ("Hz") to 400 Hz). In comparison, a standard-definition actuator is an actuator that can generate a limited range of magnitudes, or a limited range of frequencies, and has a slower response time when compared to a high-definition actuator.

FIG. 1 illustrates a block diagram of a system 10 in accordance with one embodiment of the invention. In one embodiment, system 10 is part of a mobile device, and system 10 provides a haptic effect pattern transformation functionality for the mobile device. In another embodiment, system 10 is part of a wearable device, and system 10 provides a haptic effect pattern transformation functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the haptic effect pattern transformation functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic effect pattern transformation module 16 that transforms or "warps" a haptic signal into a collection of vibrotactile haptic effect patterns, as disclosed in more detail below. In certain embodiments, haptic effect pattern transformation module 16 can comprise a plurality of modules, where each module provides specific individual functionality for transforming or "warping" a haptic signal into a collection of vibrotactile haptic effect patterns. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS$^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

Figure 2:
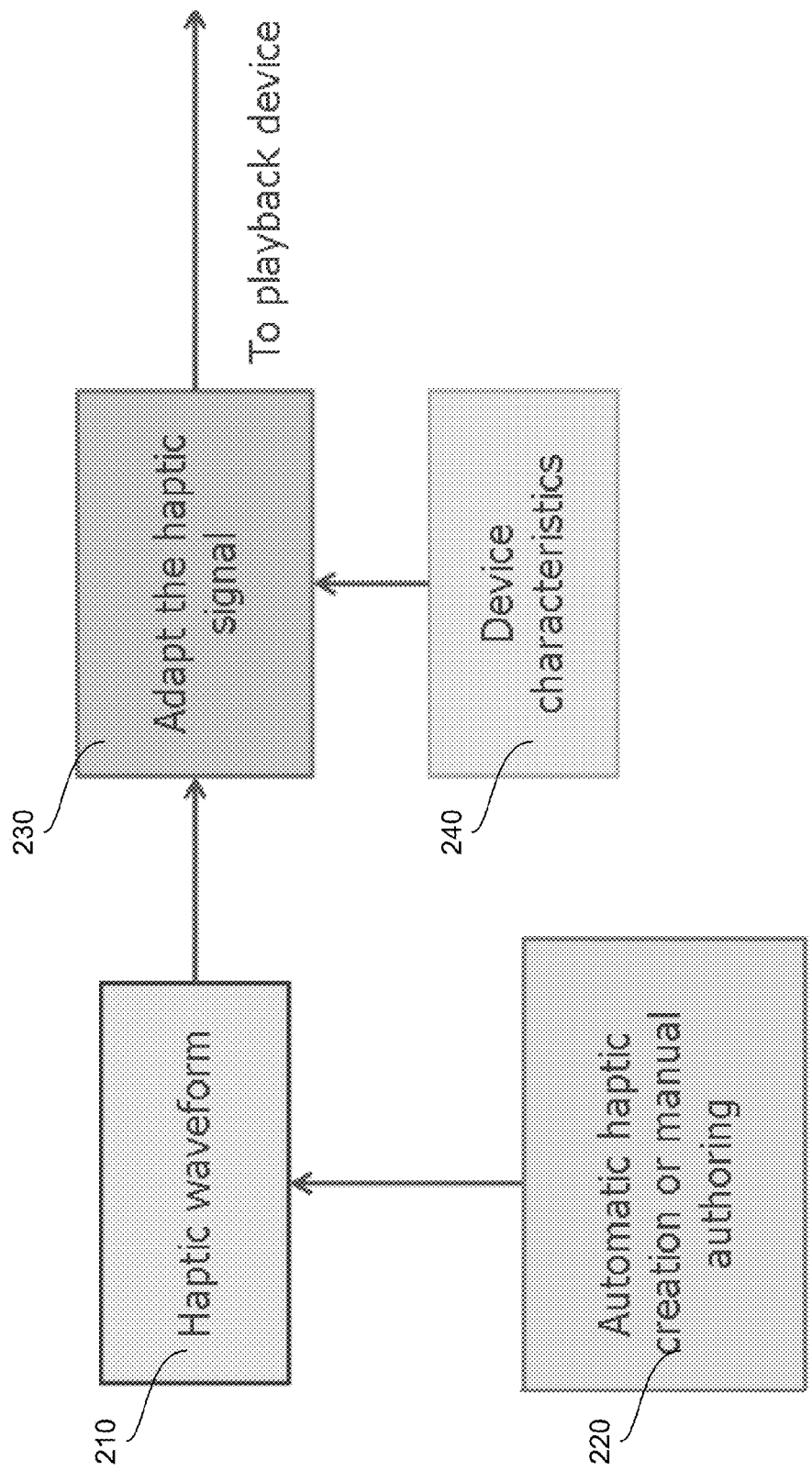
FIG. 2 illustrates a flow diagram of a system that transforms or "warps" a haptic signal into a collection of vibrotactile haptic effect patterns, according to an embodiment of the invention.

FIG. 2 illustrates a flow diagram of a system that transforms or "warps" a haptic signal into a collection of vibrotactile haptic effect patterns (or other types of haptic effect patterns), according to an embodiment of the invention. In one embodiment, the functionality of FIG. 2, as well as the functionality of FIGS. 3, 4, 5, and 6 described below, are implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

According to an embodiment, the flow begins at 210. At 210, a haptic signal is received, where a haptic signal can include data, such as a waveform, where a waveform is a set of one or more signal values in a pulse-coded modulation ("PCM") format. A haptic signal can be associated with a haptic effect, and the haptic signal can be sent to a haptic output device, such as an actuator, where the haptic output device can output the haptic effect based on the haptic signal. An example of a haptic effect is a vibrotactile haptic effect that can produce a vibration that is felt by a user of the haptic output device. Other examples of haptic effects can include electrostatic friction haptic effects, or deformation haptic effects.

According to 220, the haptic signal can be automatically created from an input signal, or can be manually created using a haptic effect development platform. More specifically, an input signal can be received, and a haptic signal can automatically be generated based on the input signal. Examples of input signals include audio signals, video signals, acceleration signals, orientation signals, ambient light signals, movement signals, temperature signals, or other similar types of signals. In an alternate embodiment, rather than being automatically generated based on an input signal, a haptic signal can be manually generated using a haptic effect development platform, such as Haptic Studio™ by Immersion Corporation. Using the haptic effect development platform, a haptic effect developer can define one or more characteristics of a haptic signal that can be used to produce a desired haptic effect, and the haptic effect development platform can generate the haptic signal based on the one or more defined characteristics. Further, the haptic signal can be designed for a specific type of haptic output device. More specifically, the haptic signal can be associated with a haptic effect space, where the haptic effect space includes a set of haptic effects that can possibly be generated by the haptic output device. The flow then proceeds to 230.

At 230, the haptic signal can be transformed or "warped" (identified in FIG. 2 as "adapted") into a special type of haptic signal that includes a collection of vibrotactile haptic effect patterns (or some other type of haptic effect patterns). As previously described, a vibrotactile haptic effect pattern is a specific type of haptic effect pattern that causes a standard-definition haptic output device (such as an ERM) to produce a vibrotactile haptic effect for a specified duration and to cease producing the vibrotactile haptic effect for a specified duration. The data contained within the vibrotactile haptic effect pattern is based on the data contained within the original haptic signal. According to the embodiment, the haptic signal is transformed or "warped" by replacing each haptic effect pattern contained within the original haptic signal with one or more vibrotactile haptic effect patterns. Such a transformation or "warping" is further described below in greater detail in conjunction with FIGS. 3-6. According to 240, the transformation of the original haptic signal into the collection of vibrotactile haptic effect patterns can be based on one or more characteristics of a target standard-definition haptic output device. For example, if a vibrotactile haptic effect pattern is to be sent to a standard-definition haptic output device that requires a specified duration to generate a vibrotactile haptic effect and a specified duration to stop generating the vibrotactile haptic effect, the generation of the vibrotactile haptic effect pattern can take into consideration the duration that the standard-definition haptic output device requires to generate a vibrotactile haptic effect and the duration that the standard-definition haptic output device requires to stop generating the vibrotactile haptic effect. Thus, the vibrotactile haptic effect pattern can be generated so that the vibrotactile haptic effect pattern produces an appropriate vibrotactile haptic effect when played at the standard-definition haptic output device. The vibrotactile haptic effect pattern can then be sent to the standard haptic output device (identified in FIG. 2 as "playback device"), where the vibrotactile haptic effect pattern is played to generate a vibrotactile haptic effect. In certain embodiments, the original haptic signal can also be sent to a different haptic output device (not illustrated in FIG. 2) to generate a complementary haptic effect that complements the vibrotactile haptic effect generated by the standard-definition haptic output device. The flow then ends.

In certain embodiments, the collection of vibrotactile haptic effect patterns that are generated can be played along with one or more audio signals and/or video signals in order to enhance a user's multimedia viewing experience. In some of these embodiments, a standard-definition haptic output device can be the same as an audio/video output device (e.g., mobile device). In some other of these embodiments, a standard-definition haptic output device can be separate from an audio/video output device (e.g., haptic chair, haptic chair, wearable haptic device, etc.).

Further, in certain embodiments, the transformation or "warping" of a haptic signal into a collection of vibrotactile haptic effect patterns can be done "offline" by a device that is separate from a device that receives the haptic signal, such as a server. When the transformation is "offline," data of the entire haptic signal can be used to transform the haptic signal into the collection of vibrotactile haptic effect patterns. The collection of vibrotactile haptic effect patterns can then be streamed back to the original device, where the original device can send the collection of vibrotactile haptic effect patterns to a standard-definition haptic output device. In alternate embodiments, the transformation or "warping" of the haptic signal into the collection of vibrotactile haptic effect patterns can be done "online" by the same device that receives the haptic signal, where the transformation can be performed in real-time or in near-real-time. In these embodiments, different portions of the haptic signal can be used sequentially to transform the haptic signal into the collection of vibrotactile haptic effect patterns, and where the entire haptic signal is not available at any specific time. Even further, in certain embodiments, the collection of vibrotactile haptic effect patterns can be stored in a computer file, or multiple computer files, rather than immediately being sent to a standard-definition haptic output device. In these embodiments, the collection of vibrotactile haptic effect patterns can be subsequently retrieved from the computer file, or multiple computer files, and the collection of vibrotactile haptic effect patterns can either be sent to a standard-definition haptic output device, or can be mixed with one or more audio signals and/or video signals.

Figure 3:
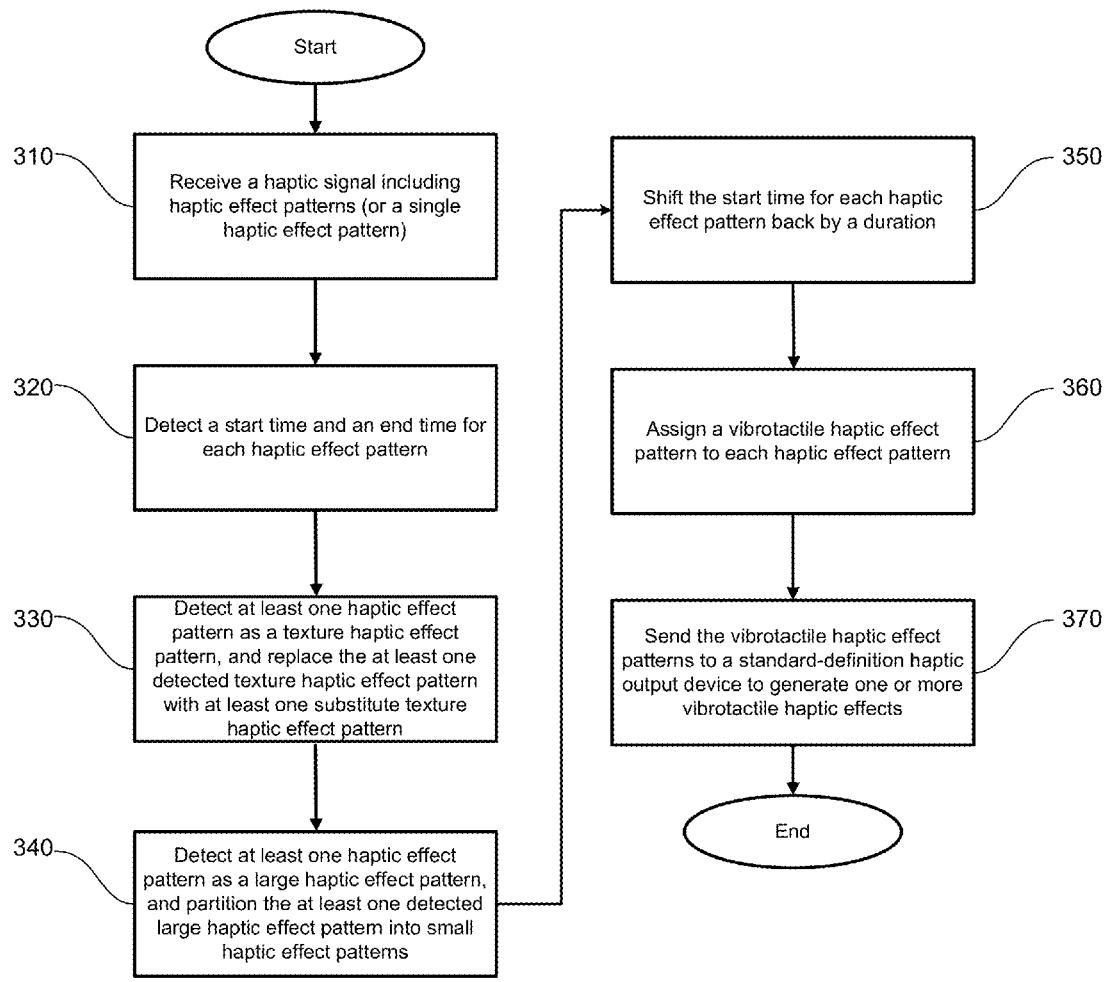
FIG. 3 illustrates a flow diagram of the functionality of a vibrotactile haptic effect pattern transformation module, according to an embodiment of the invention.

FIG. 3 illustrates a flow diagram of the functionality of a haptic effect pattern transformation module (such as haptic effect pattern transformation module 16 of FIG. 1), according to one embodiment of the invention. In certain embodiments, some of the functionality can be omitted. As previously described, the haptic effect pattern transformation module can replicate haptic effects designed for a high-definition haptic output device on a standard-definition haptic output device by transforming or "warping" a haptic signal into a collection of vibrotactile haptic effect patterns. In some embodiments, the standard-definition haptic output device can be an ERM. Further, in certain embodiments, the haptic effect pattern transformation module can be executed on a remote server. In other embodiments, the haptic effect pattern transformation module can be executed on the standard-definition haptic output device. Further, in some embodiments, one or more parameters of the haptic effect pattern transformation module can be adjusted to match the characteristics of a specific standard-definition haptic output device, and thus, provide an optimal experience for the specific standard-definition haptic output device. In other alternate embodiments, the one or more parameters of the haptic effect pattern transformation module can be used in a more generic manner for all types of standard-definition haptic output devices.

The flow begins and proceeds to 310. At 310, a haptic signal that includes a plurality of haptic effect patterns is received. In one embodiment, the haptic signal can include a single haptic effect pattern. Each haptic effect pattern can include data that causes a haptic output device to produce a haptic effect, such as a vibrotactile haptic effect, an electrostatic friction haptic effect, or a deformation haptic effect. Further, each haptic effect pattern can include a start time that defines when the haptic effect begins, and an end time that defines when the haptic effect ends. In some embodiments, the start time and end time correspond to a start time and an end time of an event in a multimedia signal (such as an audio signal, a video signal, an acceleration signal, or some other type of input signal), respectively. In certain embodiments, the haptic signal can be automatically created from an input signal. In other embodiments, the haptic signal can be manually created using a haptic effect development platform. In certain embodiments where the haptic signal is not encoded as amplitude values (such as a PCM signal), an envelope (i.e., one or more amplitude values) can additionally be extracted from the haptic signal. The flow then proceeds to 320.

At 320, a start time and an end time are detected for each haptic effect pattern of the plurality of haptic effect patterns (or the single haptic effect pattern) included within the haptic signal. Thus, according to the embodiment, the haptic effect patterns included within the haptic signal can be delineated by determining when each haptic effect pattern begins and ends. According to the embodiment, delineating the haptic effect patterns can be accomplished, at least in part, by detecting the "haptic silences" that separate the haptic effect patterns included within the haptic signal. A "haptic silence" can include data that causes the haptic output device not to produce a haptic effect, or can include a portion of the haptic signal that does not include any data. Further, a haptic silence can have a duration that is greater than or equal to a minimum duration, and that is less than or equal to a maximum duration. This can avoid the consideration of an end portion of the haptic signal as a haptic silence, and can further avoid the consideration of a single haptic effect pattern (e.g., a haptic effect pattern with a high frequency) as multiple haptic effect patterns. The flow then proceeds to 330.

At 330, at least one haptic effect pattern of the plurality of haptic effect patterns (or the single haptic effect pattern)

included within the haptic signal is detected as a "texture haptic effect pattern," and the at least one detected texture haptic effect pattern is replaced with at least one substitute texture haptic effect pattern. A "texture haptic effect pattern" is a haptic effect pattern with a duration less than or equal to a pre-defined threshold value (identified as a "texture threshold"), and that is separated from a subsequent haptic effect pattern by a duration less than or equal to the texture threshold. In one embodiment, the texture threshold is a duration of 50 milliseconds ("ms"). However, this is just an example embodiment, and in other alternate embodiments, the texture threshold can be any duration. Further, a "substitute texture haptic effect pattern" is a texture haptic effect pattern that is generated specifically for a standard-definition actuator, and thus, can have characteristics that are different from its corresponding texture haptic effect pattern, and that are more suitable for a standard-definition haptic output device. Thus, in other words, short contiguous haptic effects (also identified as "texture haptic effects," or simply "textures") are detected, as opposed to longer, more generalized haptic effects (also identified as "buzz haptic effects"), and the detected texture haptic effects are replaced with substitute texture haptic effects, where the substitute texture haptic effects are more suitable for a standard-definition haptic output device, such as an ERM. Example texture haptic effect patterns are further described below in conjunction with FIG. 7. This is an example embodiment, and in other alternate embodiments, a haptic effect pattern included within the haptic signal can be detected based on some other type of characteristic.

In certain embodiments, a duration of a substitute texture haptic effect pattern can be based on a duration of a corresponding texture haptic effect pattern and a maximum amplitude of the corresponding texture haptic effect pattern. Further, in some of these embodiments, each substitute texture haptic effect pattern can have the same duration as each other, and each substitute texture haptic effect pattern can be separated from each other by the same silent duration. Even further, in some of these embodiments, the silent duration can be twice as large as the duration of each substitute texture haptic effect pattern, in order to allow a standard haptic output device to render each corresponding haptic effect properly. Thus, in some embodiments, the number of substitute texture haptic effect patterns that replace the original texture haptic effect patterns can be less than the number of original texture haptic effect patterns. However, in other embodiments, the number of substitute texture haptic effect patterns can be greater than or equal to the number of original texture haptic effect patterns. Further, in an alternate embodiment, no haptic effect patterns included within the haptic signal are detected as texture haptic effect patterns or replaced with substitute texture haptic effect patterns. The flow then proceeds to 340.

At 340, at least one haptic effect pattern of the plurality of haptic effect patterns (or the single haptic effect pattern) included within the haptic signal is detected as a "large haptic effect pattern," and the at least one detected large haptic effect pattern is partitioned into a plurality of "small haptic effect patterns." A "large haptic effect pattern" is a haptic effect pattern with a duration greater than or equal to a pre-defined threshold value (identified as a "size threshold"). Further, a "small haptic effect pattern" is a haptic effect pattern with a duration less than the size threshold.

According to the embodiment, while a large haptic effect pattern may be intentionally created, a large haptic effect pattern can also be a result of a superposition of successive distinct haptic effect patterns with interleaving durations. Further, lengthy haptic effects that are played on a standard-definition haptic output device can deliver a negative user experience. Thus, a large haptic effect pattern can be detected as an overlap of two or more small haptic effect patterns, and the large haptic effect pattern can be partitioned into the two or more small haptic effect patterns. In accordance with the embodiment, it can be determined where to partition the large haptic effect pattern by sampling "time-windows" of the large haptic effect pattern, where a "time-window" is a portion of the large haptic effect pattern over a pre-defined duration (such as 20 ms or 40 ms). An amplitude value for each time-window can subsequently be calculated, where the amplitude value can be a maximum amplitude value, a mean amplitude value, a root-mean-square ("RMS") amplitude value, or some other type of amplitude value. The amplitude values for each set of consecutive time-windows can be compared, and it can be determined whether the change in amplitude value is greater than or equal to a pre-defined threshold value (identified as an "amplitude change threshold"). When the change in amplitude value between two consecutive time-windows is greater than or equal to the amplitude change threshold, the position between the two consecutive time-windows can be detected as a position within the large haptic effect pattern to partition the large haptic effect (also identified as a "partition position"). After all the partition positions are detected, the large haptic effect pattern can be partitioned at the partition positions, in order to partition the large haptic effect pattern into the plurality of small haptic effect patterns. Further, in an alternate embodiment, no haptic effect patterns included within the haptic signal are detected as large haptic effect patterns or partitioned into small haptic effect patterns. The flow then proceeds to 350.

At 350, the start time for each haptic effect pattern of the plurality of haptic effect patterns (or the single haptic effect pattern) included within the haptic signal is shifted back by a pre-defined duration (identified as a "shift duration"). A standard-definition haptic output device (such as an ERM) may have a slow response time, especially when compared to a high-definition haptic output device. The shifting back of the start time of each haptic effect pattern by a shift duration can compensate for the slower response time of the standard-definition haptic output device. For example, if a haptic effect is to be output at time 3 seconds ("s"), a start time of a corresponding haptic effect pattern can be shifted back by 40 ms from 3 s to 2.96 s, so that the haptic effect is output by the standard-definition haptic output device at 2.96 s rather than 3 s, but will be felt by a user at 3 s. The flow then proceeds to 360.

At 360, a vibrotactile haptic effect pattern is assigned to each haptic effect pattern of the plurality of haptic effect patterns (or the single haptic effect pattern) included within the haptic signal. Each vibrotactile haptic effect pattern can include data that causes a standard-definition haptic output device (such as an ERM) to produce a vibrotactile haptic effect for a pre-defined duration (identified as an "active duration") and to cease producing the vibrotactile haptic effect for a pre-defined duration (identified as a "silent duration"). Thus, according to the embodiment, a collection of vibrotactile haptic effect patterns is generated (or "rendered"), where each vibrotactile haptic effect pattern is assigned to a haptic effect pattern included within the haptic signal. In certain embodiments, the rendering of a vibrotactile haptic effect pattern includes limiting the active duration of the vibrotactile haptic effect pattern to a pre-defined maximum duration (identified as a "maximum duration"). The limiting of the active duration can be performed because long vibrotactile haptic effects are generally unpleasant when output on ERMs, or other types of standard-definition haptic output devices. According to the embodiment, the limiting of the active duration can be performed after the splitting of large haptic effect patterns, before the assigning of the vibrotactile haptic effect pattern to a haptic effect pattern, and either before or after the shifting back of the start time of each haptic effect pattern by a shift duration. Further, in some embodiments, the collection of vibrotactile haptic effect patterns can be stored in a computer file, such as a text file, or an audio file (e.g., PCM file).

In certain embodiments, the rendering of the vibrotactile haptic effect pattern that is subsequently assigned to a corresponding haptic effect pattern included within the haptic signal is performed differently based on the type of haptic effect pattern that the corresponding haptic effect pattern is. When a duration of the corresponding haptic effect pattern is less than a pre-defined threshold value (identified as a "duration threshold"), the vibrotactile haptic effect pattern is rendered so that an active duration and a silent duration of the vibrotactile haptic effect pattern are each set to a duration that is relative to a maximum amplitude of the corresponding haptic effect pattern. More specifically, an active duration of the vibrotactile haptic effect pattern is set to a product of a duration of the corresponding haptic effect pattern and a maximum amplitude of the corresponding haptic effect pattern, and a silent duration of the vibrotactile haptic effect pattern is set to a product of the duration of the corresponding haptic effect pattern and a difference of one and the maximum amplitude of the corresponding haptic effect pattern. The rendering of the vibrotactile haptic effect pattern in this scenario is further described below in greater detail in conjunction with FIG. 4.

In these embodiments, when the duration of the corresponding haptic effect pattern is greater than or equal to the duration threshold, a "ramp-up duration" is first calculated as a product of a pre-defined value that indicates a duration for the standard-definition haptic output device to reach a maximum vibration intensity (identified as an "intensity") and a maximum amplitude of the corresponding haptic effect pattern. Thus, the ramp-up duration indicates a duration for the standard-definition haptic output device to reach a vibration intensity that corresponds to the maximum amplitude of the corresponding haptic effect pattern. When the ramp-up duration is greater than or equal to half of the duration of the corresponding haptic effect pattern, the vibrotactile haptic effect pattern is rendered so that an active duration and a silent duration of the vibrotactile haptic effect pattern are each set to half of the duration of the corresponding haptic effect pattern. Thus, the original haptic effect pattern is replaced by a vibrotactile haptic effect pattern with equal active and silent durations that collectively cover an entire duration of the original haptic effect pattern. The rendering of the vibrotactile haptic effect pattern in this scenario is further described below in greater detail in conjunction with FIG. 5.

Further, according to these embodiments, when the ramp-up duration is less than half of the duration of the corresponding haptic effect pattern, the vibrotactile haptic effect pattern is rendered so that, in addition to an active duration and a silent duration, the vibrotactile haptic effect pattern also includes data that causes a standard-definition haptic output device to alternate producing a vibrotactile haptic effect and ceasing to produce the vibrotactile haptic effect according to a sustain function for a pre-defined duration that is between the active duration and the silent duration (identified as a "sustain duration"). The sustain function is a function that alternates equal cycles of active durations and silent durations in order to keep a vibration intensity of the standard-definition haptic output device at a specific level. The vibrotactile haptic effect pattern is further rendered so that an active duration and a silent duration of the vibrotactile haptic effect pattern are each set to the ramp-up duration, and a sustain duration is set to a difference of the duration of the corresponding haptic effect pattern and twice the ramp-up duration. Thus, the original haptic effect pattern is replaced by a vibrotactile haptic effect pattern with: (a) an active duration and a silent duration such that the standard-definition haptic output device ceases to produce a vibrotactile haptic effect at the end of the original haptic effect; and (b) a sustain duration of successive short active/silent cycles that maintain a vibration amplitude of the standard-definition haptic output device. The rendering of the vibrotactile haptic effect pattern in this scenario is further described below in greater detail in conjunction with FIG. 6. The flow then proceeds to 370.

At 370, the vibrotactile haptic effect patterns are sent to the standard-definition haptic output device to generate one or more vibrotactile haptic effects. In certain embodiments, the vibrotactile haptic effects pattern are sent to the standard-definition haptic output device within a special type of haptic signal. In some of these embodiments, the special type of haptic signal can be embedded within a multimedia computer file that includes multimedia data, or the special type of haptic signal can be saved or streamed as an independent computer file. The flow then ends.

A rendering of a vibrotactile haptic effect pattern is now described in greater detail. As previously described, in order to render each of the haptic effects of a haptic signal effectively using a standard-definition haptic output device (such as an ERM), a collection of vibrotactile haptic effect patterns are generated (i.e., rendered), and the collection of vibrotactile haptic effect patterns are used as a control signal of the standard-definition haptic output device. More specifically, a vibrotactile haptic effect pattern [a,b,c,d, . . . ] is rendered and assigned to a detected haptic effect pattern X, where the vibrotactile haptic effect pattern [a,b,c,d, . . . ] first controls the standard-definition haptic output device to produce a vibrotactile haptic effect for a ms, then controls the standard-definition haptic output device to cease producing the vibrotactile haptic effect for b ms, then controls the standard-definition haptic output device to again produce a vibrotactile haptic effect for c ms, then controls the standard-definition haptic output device to again cease producing the vibrotactile haptic effect for d ms, and so on. In one embodiment, a duration of the vibrotactile haptic effect pattern (and thus, a duration of the resulting vibrotactile haptic effect) can be limited to a specified maximal duration in order to avoid lengthy vibrotactile haptic effects, which can result in an unpleasant haptic experience. Further, in certain embodiments, each detected haptic effect pattern X can be translated into a vibrotactile haptic effect pattern based on: (a) a (possibly truncated) duration of the haptic effect pattern X, dur (X); and (b) a maximum amplitude of the duration of the haptic effect pattern X, max_amp(X). dur(X) can be a duration in ms, and max_amp(X) can be a value from 0 to 1. Different rendering scenarios are possible, as described below in greater detail in conjunction with FIGS. 4-6.

Figure 4:
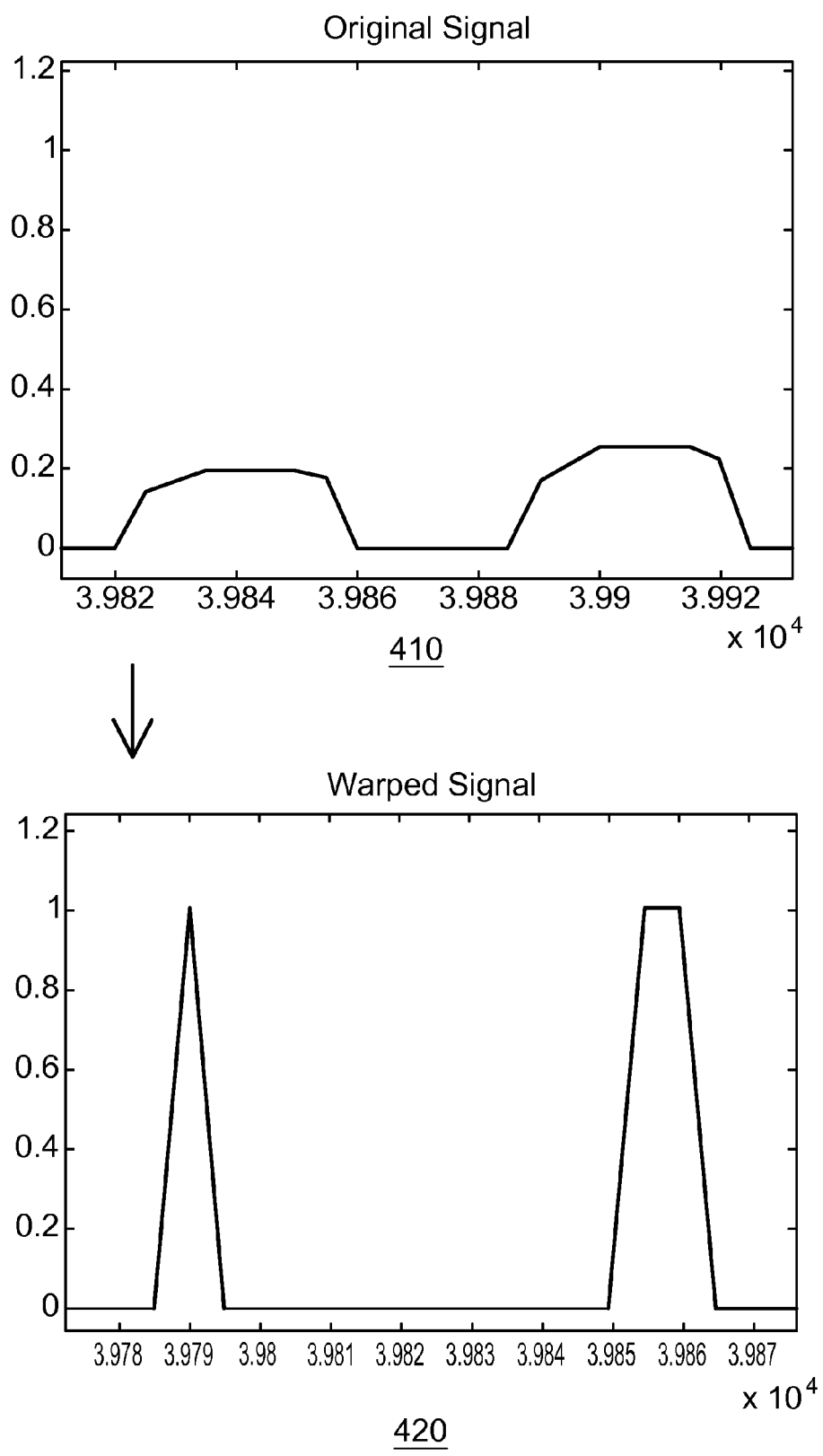
FIG. 4 illustrates an example rendering of a vibrotactile haptic effect pattern that is assigned to a haptic effect pattern of a haptic signal, according to an embodiment of the invention.

FIG. 4 illustrates an example rendering of a vibrotactile haptic effect pattern 420 that is assigned to a haptic effect pattern 410 of a haptic signal, according to an embodiment of the invention. In this rendering scenario, dur(X) is less than a certain threshold, th_sh_lg. According to this rendering scenario, haptic effect pattern X can be represented by the following vibrotactile haptic effect pattern: [dur(X)*max_amp (X), dur(X)*(1−max_amp(X))]. This is illustrated in FIG. 4, where haptic effect pattern 410 is represented by vibrotactile haptic effect pattern 420, and where vibrotactile haptic effect pattern 420 can be played at a standard-definition haptic output device. According to the embodiment, the vibrotactile haptic effect pattern [dur(X) max_amp(X), dur(X)*(1−max_amp(X))] first controls the standard-definition haptic output device to produce a vibrotactile haptic effect for a duration equal to dur(X)*max_amp(X), and then controls the standard-definition haptic output device to cease producing the vibrotactile haptic effect for a duration equal to dur(X)*(1−max_amp(X)).

Figure 5:
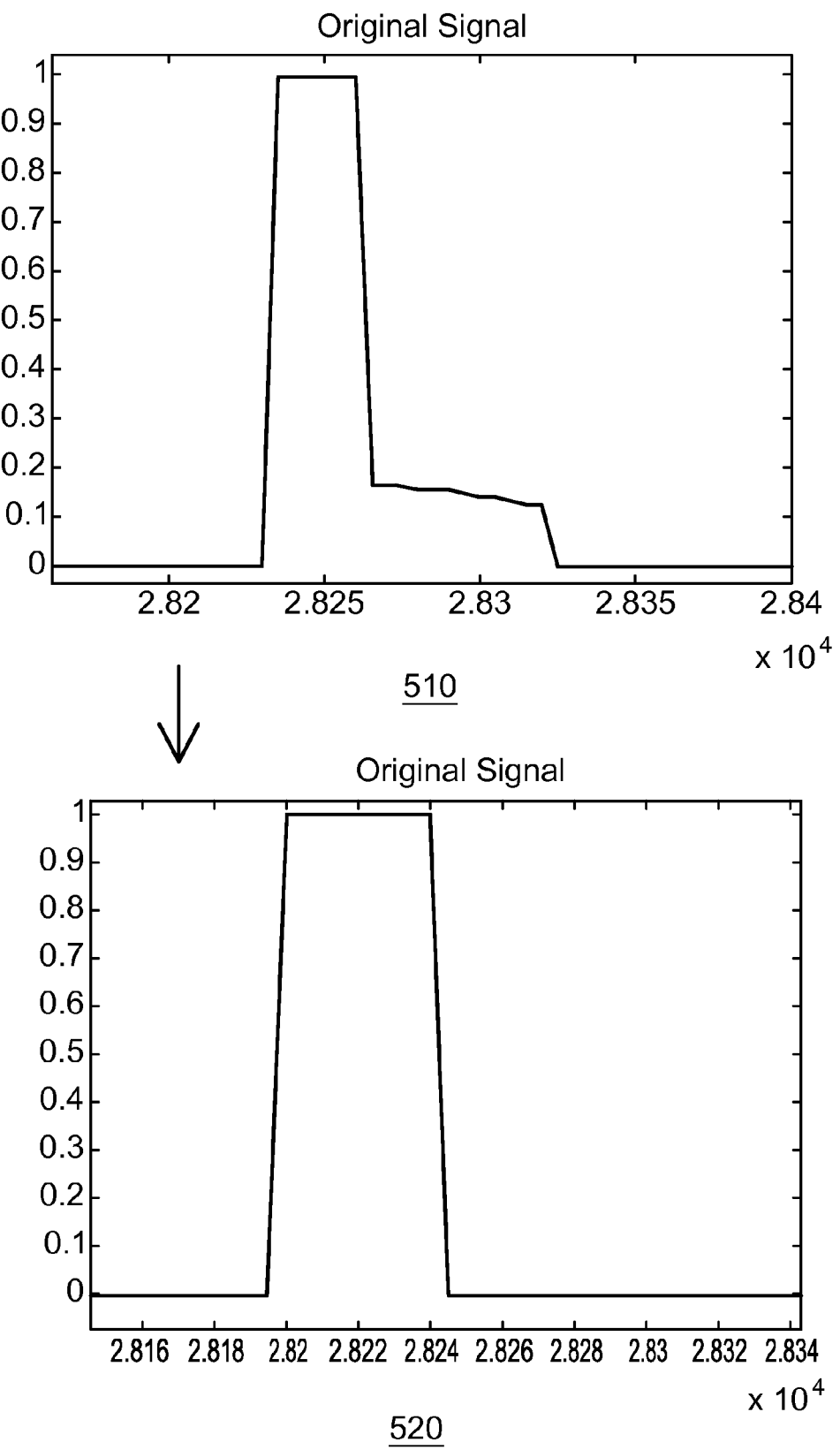
FIG. 5 illustrates another example rendering of a vibrotactile haptic effect pattern that is assigned to a haptic effect pattern of a haptic signal, according to an embodiment of the invention.

FIG. 5 illustrates another example rendering of a vibrotactile haptic effect pattern 520 that is assigned to a haptic effect pattern 510 of a haptic signal, according to an embodiment of the invention. In this rendering scenario, dur(X) is greater than or equal to th_sh_lg. According to this rendering scenario, a duration, ramp_up, is calculated, where ramp_up indicates a duration in ms for a standard-definition haptic output device (such as an ERM) to reach a vibration intensity corresponding to a haptic effect pattern's maximum amplitude. ramp_up is calculated as follows: ramp_up=intensity*max_amp(X), where intensity is a pre-set value indicating the duration in ms for the standard-definition haptic output device to reach a desired maximum vibration intensity.

Further, in this rendering scenario, ramp_up is greater than or equal to dur(X)/2. According to this rendering scenario, haptic effect pattern X can be represented by the following vibrotactile haptic effect pattern: [dur(X)/2, dur(X)/2]. This is illustrated in FIG. 5, where haptic effect pattern 510 is represented by vibrotactile haptic effect pattern 520, and where vibrotactile haptic effect pattern 520 can be played at a standard-definition haptic output device. According to the embodiment, the vibrotactile haptic effect pattern [dur(X)/2, dur(X)/2] first controls the standard-definition haptic output device to produce a vibrotactile haptic effect for a duration equal to dur(X)/2, and then controls the standard-definition haptic output device to cease producing the vibrotactile haptic effect for a duration equal to dur(X)/2.

Figure 6:
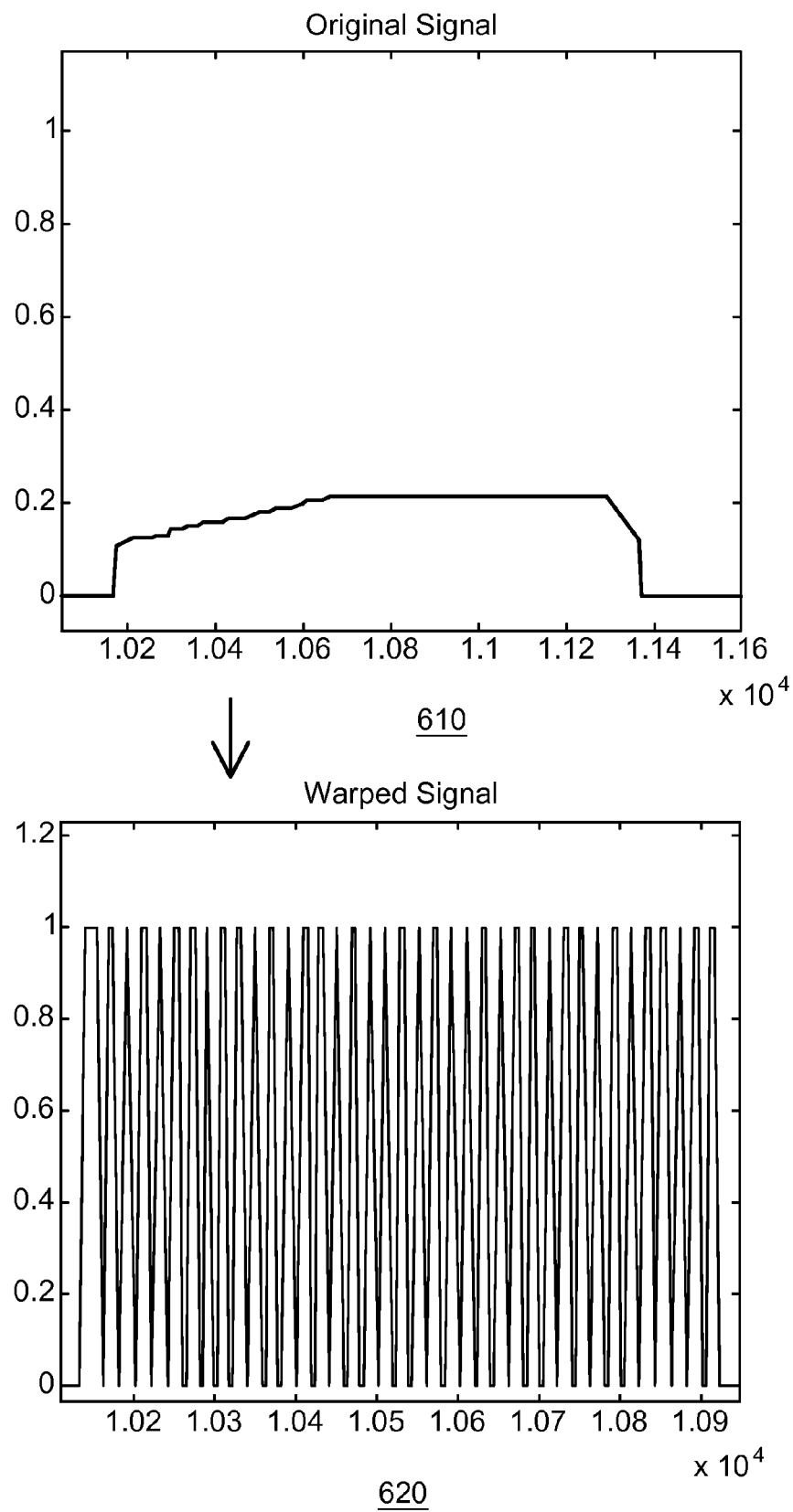
FIG. 6 illustrates another example rendering of a vibrotactile haptic effect pattern that is assigned to a haptic effect pattern of a haptic signal, according to an embodiment of the invention.

FIG. 6 illustrates another example rendering of a vibrotactile haptic effect pattern 620 that is assigned to a haptic effect pattern 610 of a haptic signal, according to an embodiment of the invention. In this rendering scenario, similar to the rendering scenario previously described in conjunction with FIG. 5, dur(X) is greater than or equal to th_sh_lg. According to this rendering scenario, a duration, ramp_up, is calculated, as previously described in conjunction with FIG. 5.

Further, in this rendering scenario, ramp_up is less than dur(X)/2. According to this rendering scenario, haptic effect pattern X can be represented by the following vibrotactile haptic effect pattern: [ramp_up, sustain(dur(X)−2*ramp_up), ramp_up], where sustain is a function that alternates equal cycles of active/silent durations in order to keep a standard-definition haptic output device's vibration intensity at a specific level. This is illustrated in FIG. 6, where haptic effect pattern 610 is represented by vibrotactile haptic effect pattern 620, and where vibrotactile haptic effect pattern 620 can be played at a standard-definition haptic output device. According to the embodiment, the vibrotactile haptic effect pattern [ramp_up, sustain(dur(X)−2*ramp_up), ramp_up] first controls the standard-definition haptic output device to produce a vibrotactile haptic effect for a duration equal to ramp_up, then controls the standard-definition haptic output device to alternate equal cycles of active/silent durations based on the sustain function, and then controls the standard-definition haptic output device to cease producing the vibrotactile haptic effect for a duration equal to ramp_up.

Figure 7:
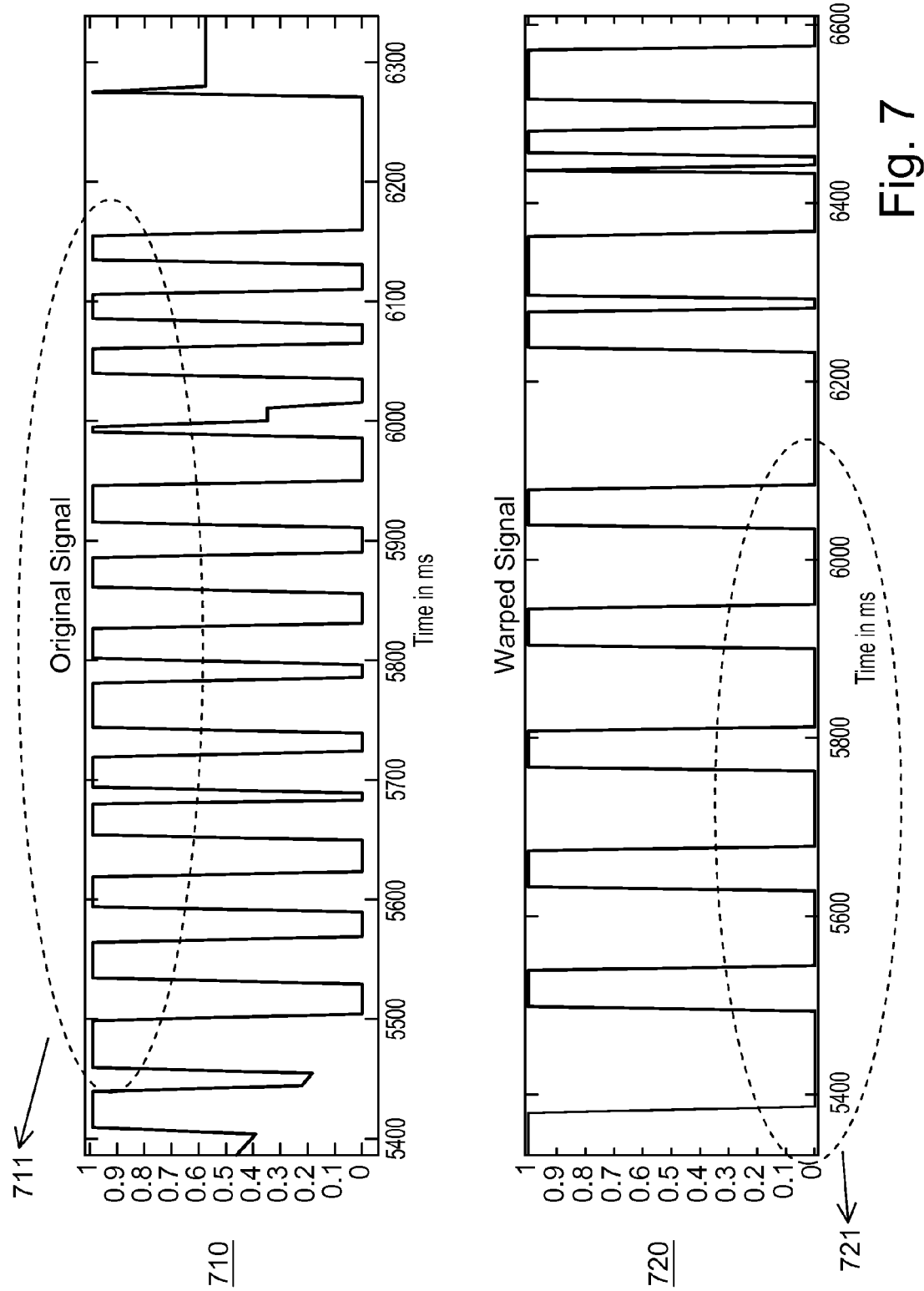
FIG. 7 illustrates example texture haptic effect patterns, according to an embodiment of the invention.

FIG. 7 illustrates example texture haptic effect patterns, according to an embodiment of the invention. More specifically, FIG. 7 illustrates an original haptic signal 710 that includes a texture haptic effect pattern 711. FIG. 7 further illustrates a warped haptic signal 720 that includes a substitute texture haptic effect pattern 721.

Thus, in one embodiment, a system can transform a haptic signal into a collection of vibrotactile haptic effect patterns for a standard-definition haptic output device, such as an ERM, by replacing each haptic effect pattern contained within the haptic signal with one or more vibrotactile haptic effect patterns that are appropriate for the standard-definition haptic output device. Thus, the system can adapt any haptic content that is created for a high-definition haptic output device (either automatically or manually) to a standard-definition haptic output device, so that the full haptic experience can be felt by a user of the standard-definition haptic output device. Therefore, a haptic designer is only required to design a haptic effect once, or execute an automatic conversion of an input into a haptic effect once. The haptic effect can then be transformed into a haptic effect suitable for a standard-definition haptic output device. This eliminates the requirement of creating a separate haptic effect for the standard-definition haptic output device.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to transform haptic signals into collections of vibrotactile haptic effect patterns, the transforming comprising:

receiving a haptic signal comprising at least one haptic effect pattern, wherein each haptic effect pattern comprises data that causes a haptic output device to produce a haptic effect;

detecting a start time and an end time for each haptic effect pattern;

shifting the start time for each haptic effect pattern back by a shift duration;

assigning a vibrotactile haptic effect pattern to each haptic effect pattern, wherein each vibrotactile haptic effect pattern comprises data that causes a standard-definition haptic output device to produce a vibrotactile haptic effect for an active duration and to cease producing the vibrotactile haptic effect for a silent duration; and sending the one or more vibrotactile haptic effect patterns to the standard-definition haptic output device to generate one or more vibrotactile haptic effects.

2. The non-transitory computer-readable medium of claim 1, the assigning the vibrotactile haptic effect pattern to each haptic effect pattern further comprising limiting the active duration of the vibrotactile haptic effect pattern to a maximum duration.

3. The non-transitory computer-readable medium of claim 1, the assigning the vibrotactile haptic effect pattern to each haptic effect pattern further comprising:
    setting the active duration of the vibrotactile haptic effect pattern to a product of a duration of the corresponding haptic effect pattern and a maximum amplitude of the corresponding haptic effect pattern, when the duration of the corresponding haptic effect pattern is less than a duration threshold; and
    setting the silent duration of the vibrotactile haptic effect pattern to a product of the duration of the corresponding haptic effect pattern and a difference of one and the maximum amplitude of the corresponding haptic effect pattern, when the duration of the corresponding haptic effect pattern is less than a duration threshold.

4. The non-transitory computer-readable medium of claim 1, the assigning the vibrotactile haptic effect pattern to each haptic effect pattern further comprising:
    calculating a ramp-up duration for the vibrotactile haptic effect pattern as a product of an intensity and a maximum amplitude of the corresponding haptic effect pattern, when a duration of the corresponding haptic effect pattern is greater than or equal to a duration threshold;
    setting the active duration of the vibrotactile haptic effect pattern to half of the duration of the corresponding haptic effect pattern, when the ramp-up duration is greater than or equal to half of the duration of the corresponding haptic effect pattern; and
    setting the silent duration of the vibrotactile haptic effect pattern to half of the duration of the corresponding haptic effect pattern, when the ramp-up duration is greater than or equal to half of the duration of the corresponding haptic effect pattern.

5. The non-transitory computer-readable medium of claim 1, wherein each vibrotactile haptic effect pattern further comprises data that causes a standard-definition haptic output device to alternate between producing the vibrotactile haptic effect and ceasing to produce the vibrotactile haptic effect according to a sustain function for a sustain duration that is between the active duration and the silent duration;
    the assigning the vibrotactile haptic effect pattern to each haptic effect pattern further comprising:
    calculating a ramp-up duration for the vibrotactile haptic effect pattern as a product of an intensity and a maximum amplitude of the corresponding haptic effect pattern, when a duration of the corresponding haptic effect pattern is greater than or equal to a duration threshold;
    setting the active duration of the vibrotactile haptic effect pattern to the ramp-up duration, when the ramp-up duration is less than half of the duration of the corresponding haptic effect pattern;
    setting the silent duration of the vibrotactile haptic effect pattern to the ramp-up duration, when the ramp-up duration is less than half of the duration of the corresponding haptic effect pattern; and
    setting the sustain duration of the vibrotactile haptic effect pattern to a difference of the duration of the corresponding haptic effect pattern and twice the ramp-up duration, when the ramp-up duration is less than half of the duration of the corresponding haptic effect pattern.

6. The non-transitory computer-readable medium of claim 5, wherein the ramp-up duration indicates a duration for the standard-definition haptic output device to reach a vibration intensity that corresponds to the maximum amplitude of the corresponding haptic effect pattern.

7. The non-transitory computer-readable medium of claim 5, wherein the intensity comprises a pre-defined value that indicates a duration for the standard-definition haptic output device to reach a maximum vibration intensity.

8. The non-transitory computer-readable medium of claim 5, wherein the sustain function comprises a function that alternates equal cycles of active durations and silent durations in order to keep a vibration intensity of the standard-definition haptic output device at a specific level.

9. The non-transitory computer-readable medium of claim 1, wherein the start time and the end time of each haptic effect pattern correspond to a start time and an end time of an event of an input signal.

10. The non-transitory computer-readable medium of claim 1, wherein the standard-definition haptic output device comprises an eccentric rotating mass actuator.

11. The non-transitory computer-readable medium of claim 1, the transforming further comprising:
    detecting at least one haptic effect pattern based on a characteristic, and replacing the at least one detected haptic effect pattern with at least one substitute haptic effect pattern.

12. The non-transitory computer-readable medium of claim 11, the detecting the at least one haptic effect pattern based on the characteristic further comprising:
    detecting the at least one haptic effect pattern as a texture haptic effect pattern, and replacing the at least one detected texture haptic effect pattern with at least one substitute texture haptic effect pattern, wherein a texture haptic effect pattern is a haptic effect pattern with a duration less than or equal to a texture threshold and that is separated from a subsequent haptic effect pattern by a duration less than or equal to the texture threshold.

13. The non-transitory computer-readable medium of claim 1, the transforming further comprising:
    detecting at least one haptic effect pattern as a large haptic effect pattern, and partitioning the at least one detected large haptic effect pattern into a plurality of small haptic effect patterns, wherein a large haptic effect pattern is a haptic effect pattern with a duration greater than or equal to a size threshold, and wherein a small haptic effect pattern is a haptic effect pattern with a duration less than the size threshold.

14. A computer-implemented method for transforming haptic signals into collections of vibrotactile haptic effect patterns, the computer-implemented method comprising:
    receiving a haptic signal comprising at least one haptic effect pattern, wherein each haptic effect pattern comprises data that causes a haptic output device to produce a haptic effect;
    detecting a start time and an end time for each haptic effect pattern;
    detecting at least one haptic effect pattern based on a characteristic, and replacing the at least one detected haptic effect pattern with at least one substitute haptic effect pattern;
    shifting the start time for each haptic effect pattern back by a shift duration;
    assigning a vibrotactile haptic effect pattern to each haptic effect pattern, wherein each vibrotactile haptic effect pattern comprises data that causes a standard-definition haptic output device to produce a vibrotactile haptic effect for an active duration and to cease producing the vibrotactile haptic effect for a silent duration; and sending the one or more vibrotactile haptic effect patterns to the standard-definition haptic output device to generate one or more vibrotactile haptic effects.

15. The computer-implemented method of claim 14, the assigning the vibrotactile haptic effect pattern to each haptic effect pattern further comprising limiting the active duration of the vibrotactile haptic effect pattern to a maximum duration.

16. The computer-implemented method of claim 14, the assigning the vibrotactile haptic effect pattern to each haptic effect pattern further comprising:

setting the active duration of the vibrotactile haptic effect pattern to a product of a duration of the corresponding haptic effect pattern and a maximum amplitude of the corresponding haptic effect pattern, when the duration of the corresponding haptic effect pattern is less than a duration threshold; and setting the silent duration of the vibrotactile haptic effect pattern to a product of the duration of the corresponding haptic effect pattern and a difference of one and the maximum amplitude of the corresponding haptic effect pattern, when the duration of the corresponding haptic effect pattern is less than a duration threshold.

17. The computer-implemented method of claim 14, the assigning the vibrotactile haptic effect pattern to each haptic effect pattern further comprising:

calculating a ramp-up duration for the vibrotactile haptic effect pattern as a product of an intensity and a maximum amplitude of the corresponding haptic effect pattern, when a duration of the corresponding haptic effect pattern is greater than or equal to a duration threshold;

setting the active duration of the vibrotactile haptic effect pattern to half of the duration of the corresponding haptic effect pattern, when the ramp-up duration is greater than or equal to half of the duration of the corresponding haptic effect pattern; and setting the silent duration of the vibrotactile haptic effect pattern to half of the duration of the corresponding haptic effect pattern, when the ramp-up duration is greater than or equal to half of the duration of the corresponding haptic effect pattern.

18. The computer-implemented method of claim 14, wherein each vibrotactile haptic effect pattern further comprises data that causes a standard-definition haptic output device to alternate between producing the vibrotactile haptic effect and ceasing to produce the vibrotactile haptic effect according to a sustain function for a sustain duration that is between the active duration and the silent duration;

the assigning the vibrotactile haptic effect pattern to each haptic effect pattern further comprising:

calculating a ramp-up duration for the vibrotactile haptic effect pattern as a product of an intensity and a maximum amplitude of the corresponding haptic effect pattern, when a duration of the corresponding haptic effect pattern is greater than or equal to a duration threshold;

setting the active duration of the vibrotactile haptic effect pattern to the ramp-up duration, when the ramp-up duration is less than half of the duration of the corresponding haptic effect pattern;

setting the silent duration of the vibrotactile haptic effect pattern to the ramp-up duration, when the ramp-up duration is less than half of the duration of the corresponding haptic effect pattern; and setting the sustain duration of the vibrotactile haptic effect pattern to a difference of the duration of the corresponding haptic effect pattern and twice the ramp-up duration, when the ramp-up duration is less than half of the duration of the corresponding haptic effect pattern.

19. A system for transforming haptic signals into collections of vibrotactile haptic effect patterns, the system comprising:

a memory configured to store a haptic effect pattern transformation module; and a processor configured to execute the haptic effect pattern transformation module stored on the memory;

wherein the haptic effect pattern transformation module is configured to receive a haptic signal comprising at least one haptic effect pattern, wherein each haptic effect pattern comprises data that causes a haptic output device to produce a haptic effect;

wherein the haptic effect pattern transformation module is further configured to detect a start time and an end time for each haptic effect pattern;

wherein the haptic effect pattern transformation module is further configured to detect at least one haptic effect pattern based on a characteristic, and replace the at least one detected haptic effect pattern with at least one substitute haptic effect pattern;

wherein the haptic effect pattern transformation module is further configured to shift the start time for each haptic effect pattern back by a shift duration;

wherein the haptic effect pattern transformation module is further configured to assign a vibrotactile haptic effect pattern to each haptic effect pattern, wherein each vibrotactile haptic effect pattern comprises data that causes a standard-definition haptic output device to produce a vibrotactile haptic effect for an active duration and to cease producing the vibrotactile haptic effect for a silent duration; and wherein the haptic effect pattern transformation module is further configured to send the one or more vibrotactile haptic effect patterns to the standard-definition haptic output device to generate one or more vibrotactile haptic effects.

20. The system of claim 19, wherein the haptic effect pattern transformation module is further configured to limit the active duration of the vibrotactile haptic effect pattern to a maximum duration.

21. The system of claim 19, wherein the haptic effect pattern transformation module is further configured to set the active duration of the vibrotactile haptic effect pattern to a product of a duration of the corresponding haptic effect pattern and a maximum amplitude of the corresponding haptic effect pattern, when the duration of the corresponding haptic effect pattern is less than a duration threshold; and wherein the haptic effect pattern transformation module is further configured to set the silent duration of the vibrotactile haptic effect pattern to a product of the duration of the corresponding haptic effect pattern and a difference of one and the maximum amplitude of the corresponding haptic effect pattern, when the duration of the corresponding haptic effect pattern is less than a duration threshold.

22. The system of claim 19, wherein the haptic effect pattern transformation module is further configured to calculate a ramp-up duration for the vibrotactile haptic effect pattern as a product of an intensity and a maximum amplitude of the corresponding haptic effect pattern, when a duration of the corresponding haptic effect pattern is greater than or equal to a duration threshold;
wherein the haptic effect pattern transformation module is further configured to set the active duration of the vibrotactile haptic effect pattern to half of the duration of the corresponding haptic effect pattern, when the ramp-up duration is greater than or equal to half of the duration of the corresponding haptic effect pattern; and
wherein the haptic effect pattern transformation module is further configured to set the silent duration of the vibrotactile haptic effect pattern to half of the duration of the corresponding haptic effect pattern, when the ramp-up duration is greater than or equal to half of the duration of the corresponding haptic effect pattern.

23. The system of claim 19, wherein each vibrotactile haptic effect pattern further comprises data that causes a standard-definition haptic output device to alternate between producing the vibrotactile haptic effect and ceasing to produce the vibrotactile haptic effect according to a sustain function for a sustain duration that is between the active duration and the silent duration;
wherein the haptic effect pattern transformation module is further configured to calculate a ramp-up duration for the vibrotactile haptic effect pattern as a product of an intensity and a maximum amplitude of the corresponding haptic effect pattern, when a duration of the corresponding haptic effect pattern is greater than or equal to a duration threshold;
wherein the haptic effect pattern transformation module is further configured to set the active duration of the vibrotactile haptic effect pattern to the ramp-up duration, when the ramp-up duration is less than half of the duration of the corresponding haptic effect pattern;
wherein the haptic effect pattern transformation module is further configured to set the silent duration of the vibrotactile haptic effect pattern to the ramp-up duration, when the ramp-up duration is less than half of the duration of the corresponding haptic effect pattern; and
wherein the haptic effect pattern transformation module is further configured to set the sustain duration of the vibrotactile haptic effect pattern to a difference of the duration of the corresponding haptic effect pattern and twice the ramp-up duration, when the ramp-up duration is less than half of the duration of the corresponding haptic effect pattern.

* * * * *